(12) United States Patent
Reghetti et al.

(10) Patent No.: US 8,224,628 B2
(45) Date of Patent: Jul. 17, 2012

(54) METHODS AND APPARATUSES FOR PLACING A FLEXIBLE DROP IN A CAD DRAWING

(75) Inventors: Joseph P. Reghetti, Reno, NV (US); Shane Hoeft, Centennial, CO (US)

(73) Assignee: M.E.P. CAD, Inc., Reno, NV (US)

( * ) Notice: Subject to any disclaimer, the term of this patent is extended or adjusted under 35 U.S.C. 154(b) by 1112 days.

(21) Appl. No.: 12/150,791

(22) Filed: May 1, 2008

(65) Prior Publication Data

US 2008/0303844 A1 Dec. 11, 2008

Related U.S. Application Data

(60) Provisional application No. 60/915,164, filed on May 1, 2007, provisional application No. 61/072,734, filed on Apr. 2, 2008.

(51) Int. Cl.
*G06F 17/50* (2006.01)
(52) U.S. Cl. .......................................................... 703/1
(58) Field of Classification Search ...................... 703/1
See application file for complete search history.

(56) References Cited

U.S. PATENT DOCUMENTS

| | | | |
|---|---|---|---|
| 4,179,751 A | 12/1979 | Adachi |
| 4,275,449 A | 6/1981 | Aish |
| 4,353,117 A | 10/1982 | Spellmann |
| 4,427,974 A | 1/1984 | Sheahan |
| 4,464,719 A | 8/1984 | Spellmann |
| 4,551,810 A | 11/1985 | Levine |
| 4,700,317 A | 10/1987 | Watanabe et al. |
| 4,700,318 A | 10/1987 | Ockman |
| 4,744,658 A | 5/1988 | Holly |
| 4,774,658 A | 9/1988 | Lewin |
| 4,789,944 A | 12/1988 | Wada et al. |
| 4,811,243 A | 3/1989 | Racine |
| 4,831,546 A | 5/1989 | Mitsuta et al. |
| 4,885,694 A | 12/1989 | Pray et al. |
| 4,964,060 A | 10/1990 | Hartsog |
| 4,985,855 A | 1/1991 | Aldrich et al. |
| 4,992,953 A | 2/1991 | Yoshida et al. |
| 5,021,779 A | 6/1991 | Bisak |
| 5,021,968 A | 6/1991 | Ferketic |
| 5,103,214 A | 4/1992 | Curran et al. |
| 5,109,337 A | 4/1992 | Ferriter et al. |
| 5,111,392 A | 5/1992 | Malin |
| 5,139,044 A | 8/1992 | Otten et al. |
| 5,189,394 A | 2/1993 | Walter et al. |
| 5,227,983 A | 7/1993 | Cox et al. |
| 5,255,207 A | 10/1993 | Cornwell |

(Continued)

OTHER PUBLICATIONS

Autosprink VR CAD program features Jul. 10, 2005 27 pages.*

(Continued)

*Primary Examiner* — Saif Alhija
(74) *Attorney, Agent, or Firm* — Woodcock Washburn LLP

(57) ABSTRACT

The present invention is directed to methods, systems, and apparatuses for automatically placing flexible drops in a computer automated design application, and more particularly to automatically placing and drawing flexible connections between sprinkler heads and sprinkler system pipes within a CAD drawing. The present invention allows a user to automatically place and draw flexible drops from numerous sprinkler heads to sprinkler system piping simultaneously based upon a set of user-chosen flex drop parameters. The present invention may also be utilized in other applications, such as automatically placing and drawing flexible electrical connections or flexible piping connections in non-sprinkler applications.

28 Claims, 11 Drawing Sheets

U.S. PATENT DOCUMENTS

| | | | |
|---|---|---|---|
| 5,260,883 A | 11/1993 | Wilson |
| 5,299,307 A | 3/1994 | Young |
| 5,329,464 A | 7/1994 | Sumic et al. |
| 5,334,970 A | 8/1994 | Bailey |
| 5,398,277 A | 3/1995 | Martin |
| 5,414,408 A | 5/1995 | Berra |
| 5,517,428 A | 5/1996 | Williams |
| 5,546,564 A | 8/1996 | Horie |
| 5,557,537 A | 9/1996 | Normann et al. |
| 5,608,375 A | 3/1997 | Kosick |
| 5,627,763 A | 5/1997 | Carlson |
| 5,655,087 A | 8/1997 | Hino et al. |
| 5,668,736 A | 9/1997 | Douglas et al. |
| 5,708,798 A | 1/1998 | Lynch et al. |
| 5,761,674 A | 6/1998 | Ito |
| 5,808,905 A | 9/1998 | Normann et al. |
| 5,812,394 A | 9/1998 | Lewis et al. |
| 5,877,683 A | 3/1999 | Sheasley |
| 5,920,849 A | 7/1999 | Broughton et al. |
| 5,977,872 A | 11/1999 | Guertin |
| 5,987,458 A | 11/1999 | Anderson et al. |
| 6,064,982 A | 5/2000 | Puri |
| 6,081,196 A | 6/2000 | Young |
| 6,119,784 A * | 9/2000 | MacDonald et al. ........... 169/43 |
| 6,141,924 A | 11/2000 | Quaintance |
| 6,236,409 B1 | 5/2001 | Hartman |
| 6,239,708 B1 | 5/2001 | Young |
| 6,266,396 B1 | 7/2001 | Johnson |
| 6,272,447 B1 | 8/2001 | Gavin et al. |
| 6,275,160 B1 | 8/2001 | Ha |
| 6,304,790 B1 | 10/2001 | Nakamura et al. |
| 6,331,982 B1 | 12/2001 | Watanabe |
| 6,333,689 B1 | 12/2001 | Young |
| 6,333,695 B2 | 12/2001 | Young |
| 6,446,053 B1 | 9/2002 | Elliott |
| 6,457,165 B1 | 9/2002 | Ishikawa et al. |
| 6,535,121 B2 | 3/2003 | Matheny |
| 6,567,772 B1 | 5/2003 | Hoeft |
| 6,604,126 B2 | 8/2003 | Neiman et al. |
| 6,636,774 B2 | 10/2003 | Tenma et al. |
| 6,760,638 B1 | 7/2004 | Love et al. |
| 6,778,081 B2 | 8/2004 | Matheny |
| 6,853,299 B2 | 2/2005 | Shiratori et al. |
| 6,879,941 B1 | 4/2005 | Ehrenberg et al. |
| 7,047,168 B2 | 5/2006 | Carballo et al. |
| 7,047,180 B1 | 5/2006 | Mathews et al. |
| 7,062,532 B1 | 6/2006 | Sweat et al. |
| 7,085,697 B1 | 8/2006 | Rappaport et al. |
| 7,096,165 B2 | 8/2006 | Pantenburg et al. |
| 7,106,330 B2 | 9/2006 | Liu et al. |
| 7,176,942 B2 | 2/2007 | Chartier et al. |
| 2001/0026225 A1 | 10/2001 | Young |
| 2001/0037190 A1 | 11/2001 | Jung |
| 2001/0047251 A1 | 11/2001 | Kemp |
| 2001/0052908 A1 | 12/2001 | Hartman |
| 2002/0035408 A1 | 3/2002 | Smith |
| 2002/0035450 A1 | 3/2002 | Thackston |
| 2002/0178428 A1 | 11/2002 | Horne et al. |
| 2002/0183982 A1 | 12/2002 | Rauscher |
| 2003/0074164 A1 | 4/2003 | Simmons et al. |
| 2003/0135352 A1 | 7/2003 | Carballo et al. |
| 2003/0142109 A1 | 7/2003 | Brown et al. |
| 2003/0167155 A1 | 9/2003 | Reghetti |
| 2004/0073410 A1 | 4/2004 | Maly et al. |
| 2004/0080407 A1 | 4/2004 | Reghetti et al. |
| 2004/0080408 A1 | 4/2004 | Reghetti et al. |
| 2004/0080409 A1 | 4/2004 | Reghetti et al. |
| 2004/0080520 A1 | 4/2004 | Reghetti et al. |
| 2004/0083080 A1 | 4/2004 | Reghetti et al. |
| 2004/0083081 A1 | 4/2004 | Reghetti et al. |
| 2005/0102051 A1 | 5/2005 | Okada et al. |
| 2007/0174026 A1 | 7/2007 | Mangon et al. |
| 2007/0174027 A1 | 7/2007 | Moiseyev |
| 2007/0179759 A1 | 8/2007 | Mangon |

OTHER PUBLICATIONS

Gonzalez et al., "VISIR, A Simulation Software for Domotics Installations to Improve Laboratory Training", 31st ASEE/IEEE Frontiers in Education Conference, Session F4C, Oct. 10-13, 2001, Reno, NV.
Muller, Nathan J., "Advanced Drawing Tools Aid Network Planning", International Journal of Network Management, vol. 7, 1997, pp. 324-333.
Ribot et al., "Development Life-Cycle With Reuse", Proceedings of the 1994 ACM Symposium on Applied Computing, pp. 70-76.
Autodesk, "Features and Benefits", Autodesk, Inc., 111 McInnis Parkway, San Rafael, CA 94903, copyright 2004.
Sigma Design, "Learning Guide for Arris Version 8.1", updated Mar. 23, 2004, copyright 2000-2004 Sigma Design.
Sigma Design, "Arris New User Tutorial", First Edition, Version 8.1, updated Jun. 9, 2004, copyright 2004 Sigma Design LLC.
Bentley, "MicroStation", product specification sheet, copyright 2003.
Edgar, J.A., "The Effectiveness of Fire Detection and Fire Sprinkler Systems in the Central Office Environment", Telecommunications Energy Conference, 1989, INTELECT '89, pp. 21.4/1-21.4/5.
Meshkat et al., "Analysis of Safety Systems with On-Demand and Dynamic Failure Modes", 2000 Proceedings, Annual Reliability and Maintainability Symposium, IEEE, pp. 14-21.
Wellman et al., "C.M. Sprinkler Systems in Electrical Control Rooms: Cause for Anxiety or Responsible Safety Design?", IEEE Transactions on Industry Applications, vol. 32, No. 1, Jan./Feb. 1996, pp. 25-30.
Meshkat et al., "Dependibility Analysis of Systems with On-Demand and Active Failure Modes, Using Dynamic Fault Trees", IEEE Transactions on Reliability, vol. 51, No. 2, Jun. 2002, pp. 240-251.
Software Engineering, Inc.; Clients; retrieved on May 16, 2005 from http://www.softwareengineering.com/clients.htm; 2 pages.
Sprinkler Design CAD Package, archive of alt.engineering.fire-protection Usenet news group, retrieved from http://groups.google.com on Feb. 3, 2006.
Ledermann, "An Authoring Framework for Augmented Reality Presentations", PhD. thesis, Vienna University of Technology, published May 12, 2004, http://www.ims.tuwien.ac.at/media/documents/publications/ledermann_thesis.pdf.
Mepcad, Inc., "New AutoSPRINK Features," AutoSPRINK 2000, Oct. 1, 1999, USA.
Mepcad, Inc., "AutoSPRINK VR: Student Workbook," AutoSPRINK VR (VR3), 2002, USA.
Mepcad, Inc., "AutoSPRINK VR: New Features Since AutoSPRINK 2000 Release," AutoSPRINK VR (VR3), Jul. 2002, USA.
Mepcad, Inc., "AutoSPRINK VR: Student Workbook," AutoSPRINK VR4, 2004, USA.
Mepcad, Inc., "AutoSPRINK VR4 New Features List—Version 4.0," AutoSPRINK VR4, Jun. 21, 2004, USA.
Mepcad, Inc., "AutoSPRINK VR5 New Features List—Version 5.0," AutoSPRINK VR5, Sep. 28, 2005, USA.
Mepcad, Inc., "AutoSPRINK VR: Student Workbook," AutoSPRINK VR5, 2005, USA.

* cited by examiner

METHODS AND APPARATUSES FOR PLACING A FLEXIBLE DROP IN A CAD DRAWING

CROSS-REFERENCES TO RELATED APPLICATIONS

This is a utility patent application, taking priority from provisional patent application Ser. No. 60/915,164, filed May 1, 2007 and 61/072,734, filed Apr. 2, 2008. This application is related to co-pending U.S. patent application Ser. No. 12/150,868, filed May 1, 2008, titled "METHODS AND APPARATUSES FOR AUTOMATICALLY SELECTING A PIPE IN A CAD DRAWING"; and U.S. patent application Ser. No. 12/150,867, filed May 1, 2008, titled "METHODS AND APPARATUSES FOR RESOLVING A CAD DRAWING CONFLICT WITH AN ARM AROUND".

BRIEF DESCRIPTION OF THE INVENTION

The present invention is directed to methods, systems, and apparatuses for automatically placing flexible drops in a computer automated design application, and more particularly to automatically placing and drawing flexible connections between sprinkler heads and sprinkler system pipes within a CAD drawing.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Computer aided design systems (often called CAD systems) have been used for years to help engineers, technicians, and architects design a wide variety of items and products. CAD users are able to utilize such computer programs to design projects ranging from small mechanical parts that will be machined from metal stock to automobiles, airplanes, bridges and multiple-story high-rise office buildings and hotels to be built by huge teams of contractors and workers. Today, CAD systems are available that are able to model and manipulate, in real-time, very large numbers of interrelated parts or components in both two-dimensions (2D) and three-dimensions (3D).

Many computer programs are commercially available that tailor the basic CAD framework for specific engineering purposes. For example, AutoSPRINK®, developed and sold by M.E.P. CAD, Inc. (assignee of the present invention), is a stand-alone computer aided design program for use in automating the design of a building control system, such as a sprinkler system or an HVAC system. Such specifically tailored CAD programs are able to run on widely available personal computers running popular operating systems like Microsoft® Windows®. Such a program allows a user to visualize, in three-dimensional space on his or her desktop computer, the available design space, such as a specific floor of a high-rise building, so that the user may lay out piping, ducts, electrical traces, cable trays, etc.

The use of CAD software applications, such as AutoCAD® by Autodesk, Inc., is well known in the art. CAD software is often used by architects and engineers to prepare a CAD model or models representing different physical objects, such as a mechanical device, a bridge, a building, an automobile, and airplane, etc. Such objects include many different parts. A building typically includes its structural components, including the beams, columns, walls, floors, windows, doors, etc. (the "frame"). The bigger and more complicated the building, the greater the likelihood that CAD software, either 2D or 3D, will be used to do the design. The design of a building is also a collaborative and iterative process. After the frame is designed by architects and structural engineers to create a CAD drawing of the building, the building drawing is then sent to other designers or subcontractors to add their components to the building design, including HVAC ducting, plumbing layouts, electrical components and fire sprinkler lines etc.

Many of these designers will use the CAD program in which the building drawing was originally created, sometimes using add-on programs that were designed for their industry, i.e., plumbing, electrical, HVAC, etc., to add their components. Additional programs, such as AutoSPRINK® could be used to both create the base drawings and to add subcontract designs, such as fire sprinkler systems. Programs such as AutoSPRINK are capable of importing or exporting different types of CAD files.

To move the design of subcontracted components along as quickly as possible, the subcontractors often work on their modifications to a building design in parallel to one another. The parallel modified CAD drawings produced by the subcontractors are then combined to create a complete design. While faster in some ways, this parallel process creates conflict problems, such as where a plumbing line input by one subcontractor conflicts with an HVAC duct input by another. Hence, extensive design review and meetings to identify and correct conflicts are often required.

JetStream™ software, formerly produced by NavisWorks Ltd. and now owned by Autodesk, Inc., is an example of a collaborative design review product for 3D designs that works in conjunction with AutoCAD and that is intended to simplify the conflict correction process. For example, it has the ability to identify where conflicts or clashes exist and can generate reports of all of the conflicts and distances by which each conflict occurs. The subcontractor that created the conflict would then be expected to resolve it and submit a new drawing, but this is not as simple as it sounds.

In a large drawing, there may be hundreds of different conflicts created by many different subcontractors. Moving a pipe, duct or cable tray to resolve one conflict, may simply create more conflicts. Likewise, simply knowing the distance by which a conflict occurs does not provide the subcontractor with all of the information necessary to completely resolve the conflict for any given area and not create others. Furthermore, even though a subcontractor may only be responsible for a handful of conflicts, that subcontractor would typically be sent the entire drawing with all of the different subcontractor conflicts and a video and/or a conflict report, and be expected to find their conflicts and resolve them. As a result, a first conflict resolution meeting or design review will often be followed by many more conflict resolution meetings as the correction of one set of conflicts can generate many more. Thus, even though programs like JetStream can be helpful, they present less than a complete solution.

As these CAD drawings are very large and contain a large number of pipes, ducts, vents, sprinklers, etc., it is desirable to have a computer program identify and then resolve a large number of conflicts all at once. It is also desirable to have a computer program that can automate various time-consuming drafting procedures, such as choosing which type of pipe to use for a specific purpose or choosing which pipe to connect a vast array of sprinkler heads to.

DETAILED DESCRIPTION OF THE INVENTION

Figure 1:
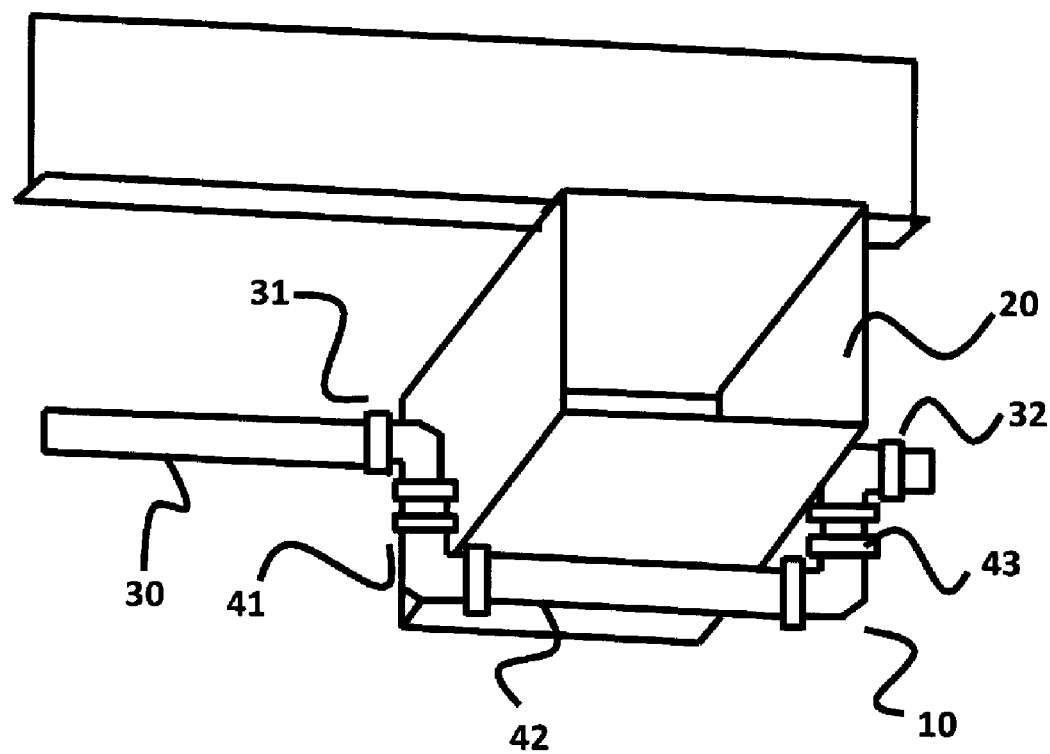
FIG. 1 is an illustration of an arm around in accordance with the present invention.

The present inventions are directed to methods, apparatuses/systems, and computer-readable medium embodying software for performing the methods and enabling the systems for processing and/or modifying a CAD drawing to resolve conflicts between existing components and automating the selection and drawing of objects, such as pipes and pipe-to-sprinkler-head connections, throughout the CAD drawing. In its presently preferred embodiment, the invention is an add-on feature for a software program written in C++ (although it could readily be written in VisualBasic and/or Autolisp), the software program operating in a stand-alone fashion or in conjunction with the AutoCAD platform by Autodesk, Inc. The present invention is not limited to the AutoCAD platform and could be utilized in conjunction with any CAD program. As utilized in conjunction with AutoCAD, once installed, the present invention would be incorporated into the standard menu bar for the AutoCAD program, so that it is readily accessible within the AutoCAD system.

The presently disclosed invention includes add-on features to presently existing CAD software and includes systems, methods, apparatuses, and computer programs for resolving CAD drawing conflicts in real time and for automating the selection of objects, including pipes and the drawing of pipe-to-sprinkler-head connections. Throughout this specification the invention will, for the most part, be referred to as a system. This specification, however, intends to cover the presently disclosed inventions as methods for automatically improving, adding additional features to, and processing various piping-related features of a CAD application, computer programs for automatically improving, adding additional features to, and processing various piping-related features of a CAD application, and apparatuses for automatically improving, adding additional features to, and processing various piping-related features of a CAD application.

Where this specification refers to the system's characteristics described herein, note that the same description applies to related methods, apparatus, and computer programs. Additionally, as this invention involves CAD drawings that are 2D or 3D representations of physical building construction components (beams, columns, walls, piping, ducts, etc), where, for example, the specification refers to a "pipe" or a "duct", the intention is to describe the CAD drawing representation as seen by a user on his or her computer screen, as opposed to a real physical "pipe" or "duct." A reader should also note that in all cases a CAD drawing may be either 2D or 3D, or perhaps may be convertible between 2D and 3D, regardless of whether this specification describes a particular feature or function as being 2D or 3D.

The process of designing sprinkler, HVAC, etc., systems in large buildings such as office buildings, hotels, casinos, and schools, is complex and involves many different people working on many different aspects. All sorts of piping, vents, and ducts must be situated so that they are effective and cost efficient without conflicting with each other or conflicting with necessary weight-bearing beams, columns and other structural elements. Often each system (HVAC, sprinkler, plumbing, etc.) is designed separately by entirely different people or teams of people.

After completing their own draft design, these groups meet to discuss the inevitable real or potential conflicts. For example, a proposed heating duct may pass right through various proposed plumbing pipes. In this case, the heating duct may be referred to as an obstruction, or the obstruction, for which a proposed arm around is needed so that the plumbing pipes may reach their desired destination and thus be functional. In the context of the present invention, an "arm around" is a pipe design that allows a pipe, that would have gone straight to its intended destination if not for an obstruction, to reach its intended destination by detouring, or re-routing, around the obstruction. Although the invention is described in the context of a building design application, and in particular in the context of a fire sprinkler design system, the present invention could be utilized in the design of anything that could be designed using a CAD application. For example, an arm around could be utilized for routing wiring in a car design around some obstruction, or hydraulic lines in an airplane design, etc.

A method of creating an arm around for a fire sprinkler system involves cutting a pipe in two places: once at the beginning of the obstruction (called the first cut line) and again at the end of the obstruction (called the second cut line). Usually three relatively small segments of pipe are then fitted together, with the usual configuration being that the first segment is perpendicular to the original pipe, the second segment is parallel to the original pipe, but in a plane that does not intersect with the obstruction, and the third segment is again perpendicular to the original pipe and connects the parallel segment to the original pipe at the second cut line, completing the pipe.

An example of an arm around is illustrated in FIG. 1. Arm around 10 is necessary to avoid obstruction 20. Original pipe 30 is cut at first cut line 31 and at second cut line 32. First perpendicular segment 41 protrudes out from first cut line 31, then parallel section 42 (which may be referred to as the "moved pipe" segment) follows original pipe 30 past obstruction 20 and intersects with second perpendicular segment 42, which then joins original pipe 30 at second cut line 32. In this way, original pipe 30 is able to reach its intended destination while avoiding obstruction 20. The method, apparatus, and system for automatically creating such arm arounds within a CAD drawing is referred to as "Arm Around" (capitalized). The presently disclosed invention, which may be referred to as the Arm Around add-on feature (or the Arm Around utility) for CAD software programs, allows for easy, real time resolution of obstruction conflicts.

The present invention is relevant at the point in time after the structure, various piping, and various duct systems have been initially placed, or proposed, within the work space. These systems may initially be designed without concern for conflicts. After initial drafting and design, the disclosed CAD drawing conflict resolution system may begin by identifying all conflicts. The present invention may also work with previously identified conflicts by resolving conflicts previously identified by another program. Found conflicts are listed in a conflict list window, and are also highlighted within the on-screen 3D (or 2D, if so desired) representation of the overall design. The overall 3D or 2D representation will be referred to as the CAD drawing, while the Arm Around system and user-customizable options are contained in the Arm Around dialog box 200, first illustrated in FIG. 2.

Conflicts may be identified within a CAD drawing by highlighting conflicted objects by color or by so-called "conflict bubbles" or "alert bubbles", which highlight a conflict with different colored, transparent bubble- or balloon-shaped polygons that can be easily identified on screen. Then, the user may select one or more conflicts he or she wishes to work on presently. Such a selection may be accomplished in any number of ways. For example, a user may click on, or select, a pipe within the overall drawing and then may select an Arm Around icon from a menu or tool bar button in order to bring up the Arm Around dialog box 200. Alternatively, a user may directly select the Arm Around icon and bring up the dialog box 200, which then may show a list of all identified conflicts.

The Arm Around dialog box 200 includes a listing of one or more pipes which have been identified as being in conflict with at least one other CAD drawing component. The list has information to identify each conflicted pipe which can include, for example, a component identification number, a description of the pipe in terms of diameter, material, and/or length, and a description of the location (either an absolute location or a relative location in regard to other components or convenient landmarks).

Conflicts are resolved by altering the smaller diameter pipe or pipes so that they avoid large obstructions. This is accomplished by creating an arm around as described above. Such an arm around may take the pipe above the other component, below the other component, to the right of the other component, to the left of the other component, or may find a more desirable angled solution utilizing a 180 or 360 degree search. The user may elect to design the arm around them self or elect to allow the system to automatically determine which method of movement will be most cost efficient, most material/resource efficient, or most easily accomplished. In either case, the user may select the desired clearance between the pipe and the obstruction. For example, a user may choose to require a one inch clearance between the two components, and in such a case the system would only propose one or more resolutions that provide for a one inch clearance between the two previously conflicting components.

Once the user has selected the way in which the user wishes to resolve the chosen conflict(s), the system automatically calculates the required arm around to resolve the conflict(s). This system calculated solution may be referred to as a "proposal." The system may then temporarily draw the proposal into the CAD drawing to a user specified "clearance" distance from the object. This temporarily drawn proposal may be referred to as a "ghost" line, and is useful to the user because it uses simple pencil-type lines (which may be dashed) to show where the proposed arm around will be located relative to existing components, without requiring the heavy computer processing power which may be needed to draw full-scale 3D piping. Once the user determines whether he or she wishes to use the initial proposal, the user may select to accept the proposal, and then the ghost line is replaced with actual CAD-drawn 3D arm around piping.

There are, of course, many possible variations of the above-described conflict avoidance CAD add-on system that will be apparent to those skilled in the art. For instance, a user may be able to select multiple conflicts as a group, and then apply a single set of chosen parameters to all of the conflicts within the group at once. An example would be to select all instances of various pipes in conflict with a particular ventilation duct, and then to ask the system to propose a clearance of 4 inches using the shortest amount of piping possible while maintaining right angles. Such a set of chosen parameters may be applied to a group of conflicts all at once. Another example would be to ask the system to select all identified conflicts within a specified work area (on the seventh floor of the office building, for example) and then to request proposed arm arounds with a 2 inch clearance above the known obstructions. Any permutations of the disclosed arm around system are possible, and all such permutations that would be obvious to a person skilled in the art are intended to be within the scope of this disclosure.

Figure 2:
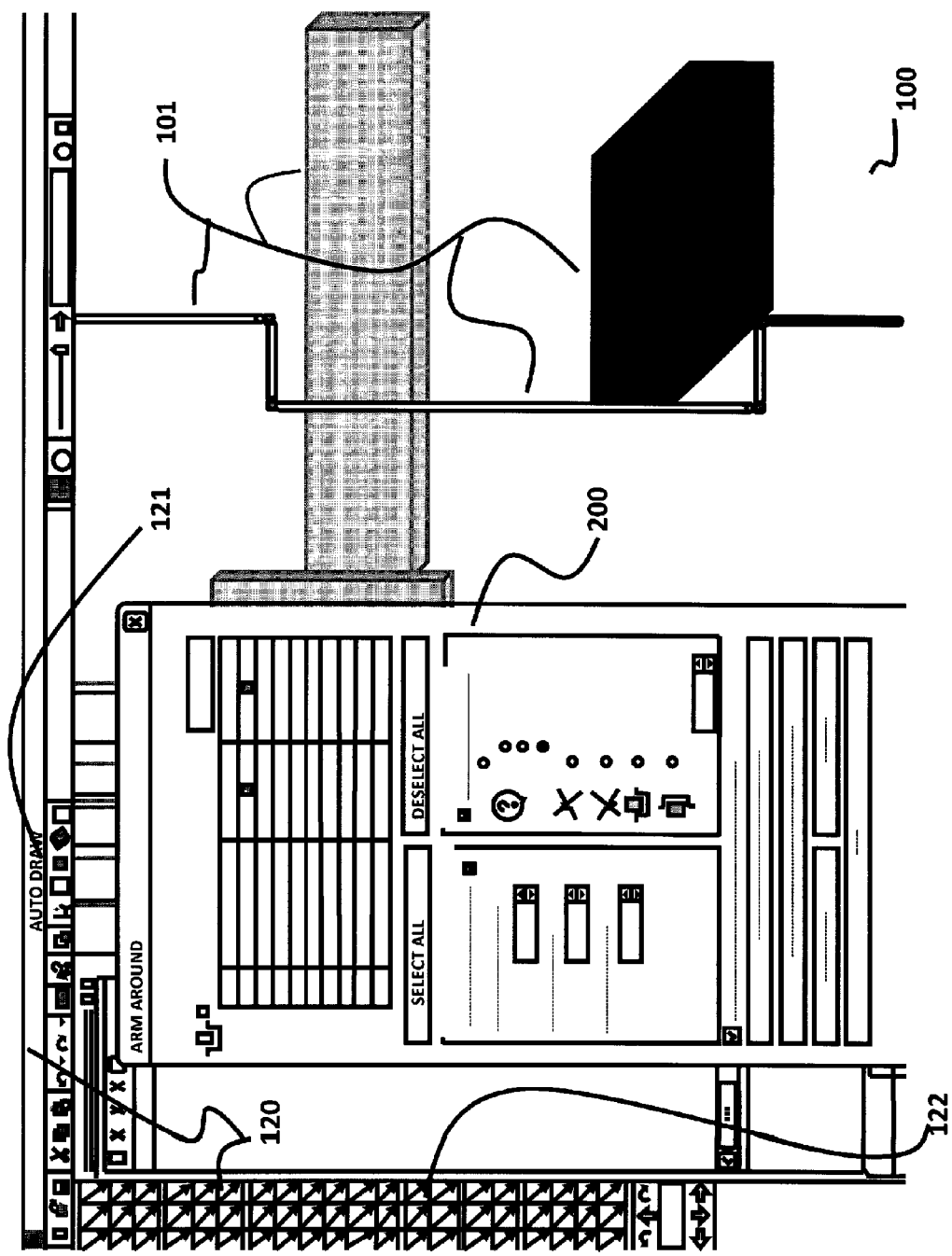
FIG. 2 is an illustration of an Arm Around dialog box utilized in a CAD drawing program in accordance with the present invention.
Figure 3:
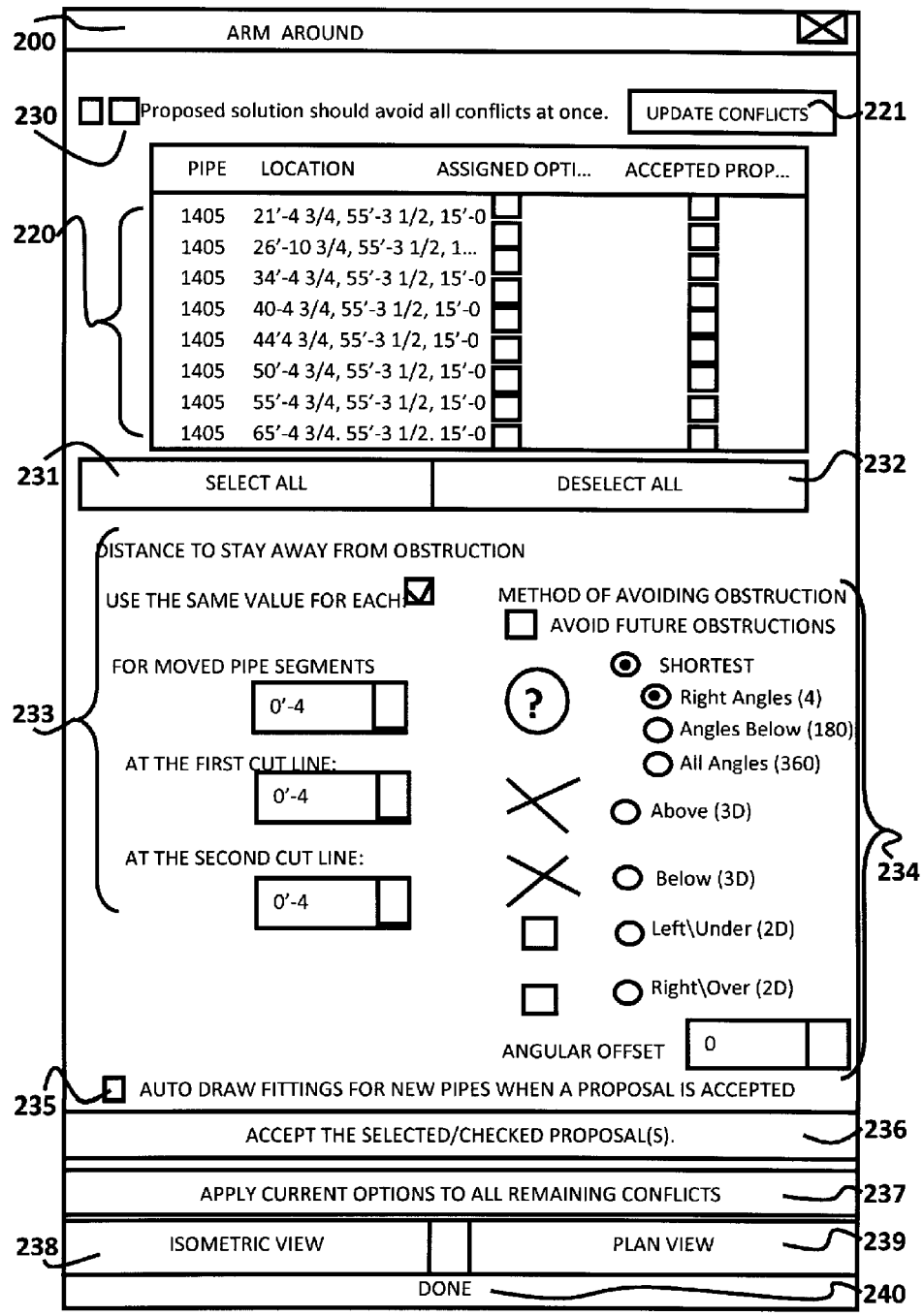
FIG. 3 is an illustration of the Arm Around dialog box of FIG. 2.

FIGS. 2 and 3 illustrate an example embodiment of the herein disclosed CAD drawing conflict resolution system. FIG. 2 shows an example CAD program computer screen 100 that a user would encounter while using AutoSPRINK, or another comparable CAD drafting software program. A user would see 3D representation 101 of his or her design, and various menus and icons 120 which provide drafting and modification options. In order to utilize the herein disclosed CAD drawing conflict resolution system, a user must access Arm Around dialog box 200. Arm Around dialog box 200 may be accessed by selecting either the Arm Around button 122 in the left-side tool bar, or by selecting the Auto Draw drop-down menu 121 at the top of the screen, and then selecting Arm Around within that drop down menu 121.

FIG. 3 illustrates a detailed example of the Arm Around dialog box 200. Conflict list 220 shows a listing of the identified conflicts available for conflict resolution. Conflict list 220 contains four information columns shown in FIG. 2. These include a "Pipe" column for listing the CAD drawing identification of each conflicted pipe; a "Location" column for listing a description of the location of the pipe either relative to other CAD drawing components or an absolute location; an "Assigned Option" column which contains boxes for each listed conflict which may each be checked by a user; and an "Accepted Proposal" column which contains boxes for each listed conflict which may each be checked by a user. It is also possible to include either more information or less information in conflict list 220, by including more, less, or different information columns. For instance, an information column may be included which describes the parameters of each conflicted pipe, such as diameter, width, length, purpose, and/or material composition. Any and all permutations of pipe information may be included in the conflict list 220, as will be appreciated by those skilled in the art.

There are several ways in which a user may get CAD application or AutoSPRINK conflicts into the Arm Around conflict list 220. First, the CAD application or AutoSPRINK may automatically identify conflicts that are then automatically inserted into conflict list 220 when a user accesses Arm Around dialog box 200. Second, a user may self-select apparent, known, or identified (by conflict bubbles) conflicts in main CAD drawing 101, and then click on Update Conflicts button 221 to bring these self-selected conflicts into conflict list 220 if Arm Around dialog box 200 is already open, or self-select conflicts in main CAD drawing 101 and then access Arm Around dialog box 200 as described above. Third, a user may define a certain work area within the main CAD drawing 101, and the system will automatically identify any conflicts within the area. These identified conflicts are then either automatically included in conflict list 220 when the user opens Arm Around dialog box 200, or can be brought into a previously opened Arm Around dialog box 200 conflict list 220 by the user clicking Update Conflicts button 221.

A user may then select various options for how to resolve the conflicts listed in conflict list 220. First, the user may select which conflict or conflicts the user wishes to assign options to (more than one conflict or resolution may be selected at a time by checking the respective boxes within the Assigned Options column of conflict list 220). When the desired conflicts are selected, the program may automatically center the selected obstruction in the drawing for ease of viewing then a user may choose the desired distance to stay away from each obstruction at 233, and/or the desired method of avoiding each obstruction at 234. The desired distance to stay away from each obstruction means how much clearance, in units of measure such as inches or centimeters, each pipe should have around each obstruction. For example, choosing 4 inches at 233 would force the disclosed system to propose a solution wherein the piping is kept at least 4 inches away from the obstruction as it works its way around the obstruction. More complex "stay away" options may be selected by a user. Looking to options 233, it may be possible for a user to select different options for the three different parts of the Arm Around: the Moved Pipe Segment, the first cut line segment, and the second cut line segment. It is also possible to use the same distance value for all three segments, and this may be done by the user clicking on the "Use the same value for each:" box at 233.

At options 234, a user may select the desired method of avoiding each obstruction. For example, a user may select to avoid the obstruction by moving the pipe Above, Below, to the Left, or to the Right, by clicking on the appropriate button at 234. When a user makes this selection, the system may then respond by displaying the "ghost" proposal line for each chosen option. A user may instead choose to have the system calculate the shortest route possible to sufficiently avoid the obstruction, by clicking on the Shortest button at 234. If a user selects the Shortest button at 234, the user may then be able to select search angles to be created by the Arm Around, by choosing angles below 180 degrees or all angles 360 degrees. When this selection is made, the system will search in a 180 or 360 degree pattern around the obstruction for the shortest clearance route with the appropriate specified clearance. Within options 234, a user may click the "Avoid Future Obstructions" button, which will ensure that proposed arm arounds do not create additional conflicts by coming in contact with additional obstructions while avoiding the original conflict. For example, if a user uses Arm Around to find an arm around for a pipe in conflict, the proposed arm around may itself come into conflict with another object that is in close proximity to the original obstruction. By selecting "Avoid Future Obstructions", the system will redraw the arm around proposal line to avoid all other obstructions at once.

In addition to selecting options related to how each Arm Around proposal will be calculated at 233 and 234, a user may also choose several additional preferences. Clicking box 235 will force the Arm Around system to automatically draw fittings or connectors for the proposed Arm Around when the full 2D or 3D pipe drawing is created from the proposal line. By clicking on box 230, a user is able to force the system to calculate proposals that avoid all known conflicts at once for one or more specific pipes. For example, one pipe may be conflicting with several obstructions with each showing a proposal line to avoid the obstruction. By selecting box 230, the system will automatically delete all the individual obstruction proposals and display a new proposal line that will avoid all conflicts at one time. By clicking on button 237, a user is able to apply all the selected options from 233 and 234 to all remaining conflicts in conflict list 221. By clicking on button 236, a user is able to accept all proposals that have been checked within the Assigned Options column of conflict list 220, or within the Accepted Proposal column of conflict list 220, to initiate piping all selected obstructions. Buttons 238 and 239 give the user the option of selecting the view of the arm around and conflict area that will be shown to the user within the drawing. Finally, by clicking button 240, a user is able to close Arm Around dialog box 200.

In addition to the above described CAD drawing conflict avoidance Arm Around add-on feature, additional CAD software add-on features will be described. A method, system, and apparatus for automatically selecting a pipe will now be described. This may alternatively be referred to as a Smart Pipe Interface. As with the above described CAD drawing conflict resolution system, the Smart Pipe Interface will generally be referred to herein as a system. This specification does, however, intend to include within its scope the related methods of automatically determining a system pipe type, the related computer program for automatically determining the proper system component pipe type, and the related apparatus for automatically determining the proper system component pipe type, i.e. crossmain, branch line, riser nipple, etc. The method, system, and apparatus for automatically determining a pipe, when utilized by a user, allows for simplified drawing of pipes for use in sprinkler, plumbing, and other building system designs.

The herein described Smart Pipe Interface allows a user to pre-select various pipe parameters that are later automatically applied to pipes drawn into the overall CAD drawing. For example, a user only has to select a pipe size from a CAD computer program pipe-drawing menu, and then draw the pipe where he or she desires. Then, the Smart Pipe system applies a series of predetermined rules and previously user-chosen parameters (size, orientation, location, association, etc.) to decide the system component Type (crossmain, branch line, riser nipple, etc.) or Material (Schedule 40, etc.), for example. The disclosed Smart Pipe Interface saves a significant amount of time for users by allowing them to simply choose a diameter or other parameter up-front and then concentrate on drawing/drafting without having to make a myriad of decisions on each and every pipe drawn. Alternatively, the Smart Pipe Interface also allows a user to change his or her mind after drafting a myriad of pipes, and alter the characteristics of the many pipes all in one place—without having to click on each pipe individually and change its individual characteristics. The system will also correct any pipes that were drawn incorrectly by selecting them and applying an automated cleanup function.

A Smart Pipe Interface may utilize one or more rules that may be adjustable by a user as well as one or more rules that may not be adjustable by a user to automate the determination of a pipe type. For example, a rule stating that "pipes touching like pipes will become the same pipe" may be utilized. Such a rule may or may not be adjustable by the user. An example of a rule that may be user adjustable may be "pipes that are between 1 and 2½ inches are to be Schedule 10 material." Such a rule may be adjustable so that, for example, a user may choose to decide instead that "pipes that are between 1 and 2½ inches are to be Schedule 40 material." These rules may be utilized so that, for example, when a user selects a pipe of 2 inch diameter and draws that pipe from a branch line to another branch line, the pipe being drawn will automatically be set by the Smart Pipe interface as Schedule 10 material and as a branch line.

The following automatic pipe selecting rules are a non-exhaustive list of non-user-adjustable rules that may be utilized by the herein disclosed Smart Pipe Interface:
If the pipe is smaller than, or equal to the Branch Line cutoff [Branch Line cutoff is set by the user], the pipe will be a Branch Line.
If the pipe is vertical and is larger than the Branch Line cutoff, the pipe will be a Feed Riser.
If the pipe is horizontal and larger than the Branch Line cutoff, the pipe will be a Cross Main.
If the pipe connects a Cross Main or Feed Main to a Branch Line, the pipe will be a Riser Nipple.
If the pipe connects a Feed Riser and a Cross Main, and is horizontal, the pipe will be a Feed Main.
If this same pipe connects to an Upright Sprinkler, the pipe will be a Sprig.
If this same pipe connects to a Sidewall or Pendent sprinkler, the last pipe touching the sprinkler will be a Drop and the remainder will stay a branch line.
If both ends of the pipe are connected to a Branch Line, the pipe will be a Branch Line.
If both ends of the pipe are connected to a Cross Main, the pipe will be a Cross Main.
If both ends of the pipe are connected to a Feed Main, the pipe will be a Feed Main.
If both ends of the pipe are connected to a Feed Riser, the pipe will be a Feed Riser.
If both ends of a Branch Line pipe are connected to a Riser Nipple, the pipe will remain a Branch Line.
If both ends of the pipe are connected to a Sprig, the pipe will be a Sprig.
If both ends of the pipe are connected to a Drop, it will remain a branch line.
If the pipe is a Feed Main and is collinear with a Cross main, the pipe will be a Cross Main.
If both ends of the pipe are at below true zero elevation in the drawing, the pipe will be an Underground pipe. (Note that this rule may instead be user-adjustable.)
Pipes touching like pipes will become the same pipe except for pipes touching riser nipples on both ends.

Of course, many additional rules and many alternatives of the rules listed above are possible and will be apparent to those skilled in the art. A user may also choose to individually define pipes in a manner different than the predefined rules and/or different than the user-determined rules. To override the Smart Pipe rules, a user may select an override option when initially drawing a pipe or may instead select an override option on a previously drawn pipe.

Figure 4:
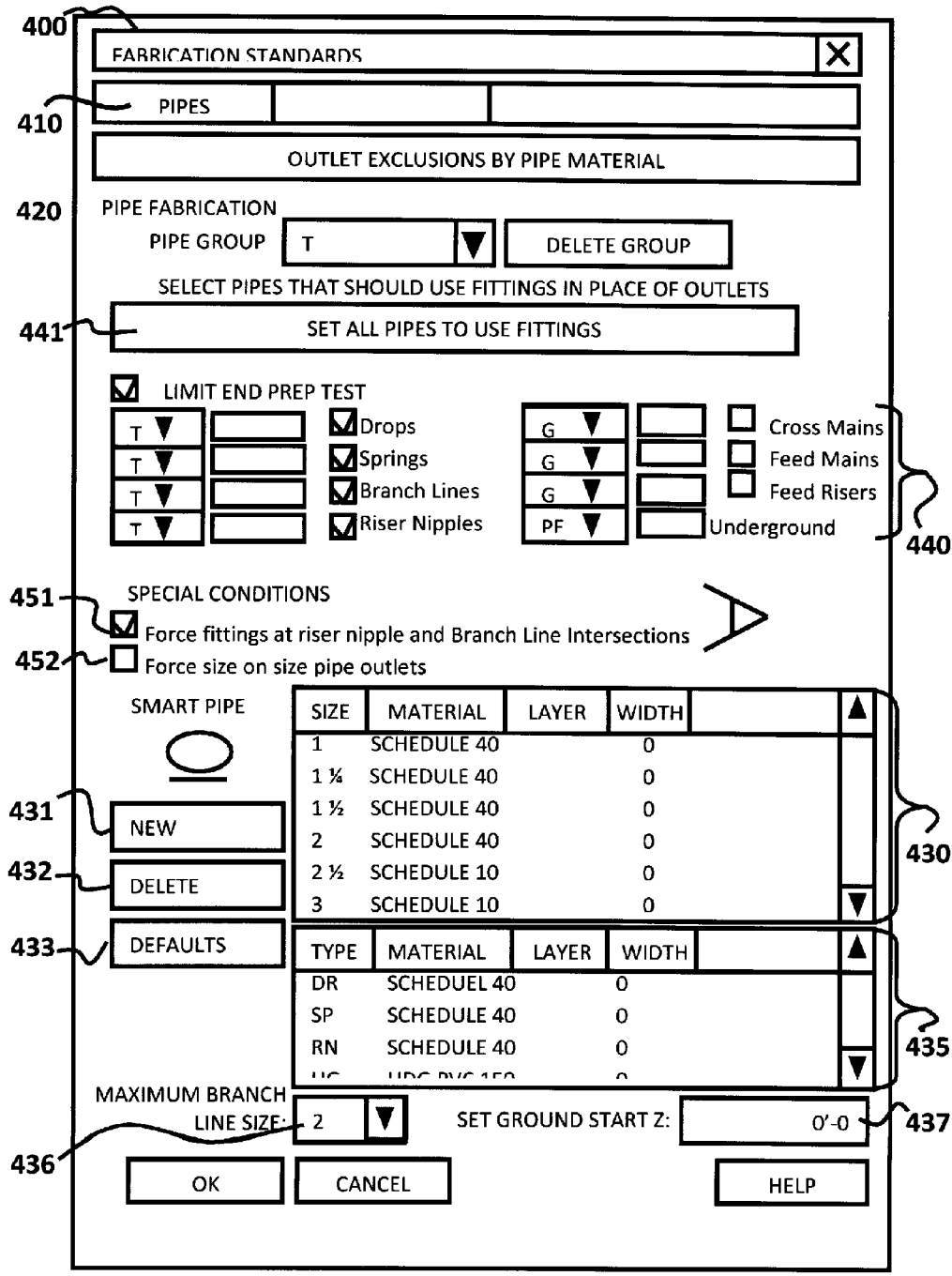
FIG. 4 is an illustration of a dialog box including a Smart Pipe interface in accordance with the present invention.

FIG. 4 illustrates an example embodiment of the disclosed system for automatically determining a pipe, which may also be referred to as the Smart Pipe Interface. FIG. 4 is a screen shot of Fabrication Standards dialog box 400. Fabrication Standards dialog box 400 may be accessed by a user by selecting "Fabrication Standards" from an AutoSPRINK drop-down menu or icon located in a tool bar, or from similar menus or tool bars in other available CAD drawing programs. A user may start a process of selecting various pipe preferences by selecting, or clicking on, "Pipes" tab 410 at the top of Fabrication Standards dialog box 400. A user can also select various Pipe Groups from Pipe Group drop-down list 420. Pipe Group drop-down list 420 contains a list of each group of available pipes, and may contain, for example, Pipe Groups T, W, X, P, and C, as well as Pipe Groups 1, 2, 3, 4, 5, 6, 7, 8, and 9. Once a user selects a Pipe Group at 420, the user may then select various parameters which will be automatically assigned to each pipe of that group. For example, if a user selects Pipe Group "T" at 420, the user can select parameters for all "T" Group pipes the user has previously drawn in the overall CAD drawing and all "T" Group pipes that will be drawn. Then, the user can select another Pipe Group, "W" for example, and select parameters for all "W" Group pipes previously drawn or that will be drawn.

Figure 5:
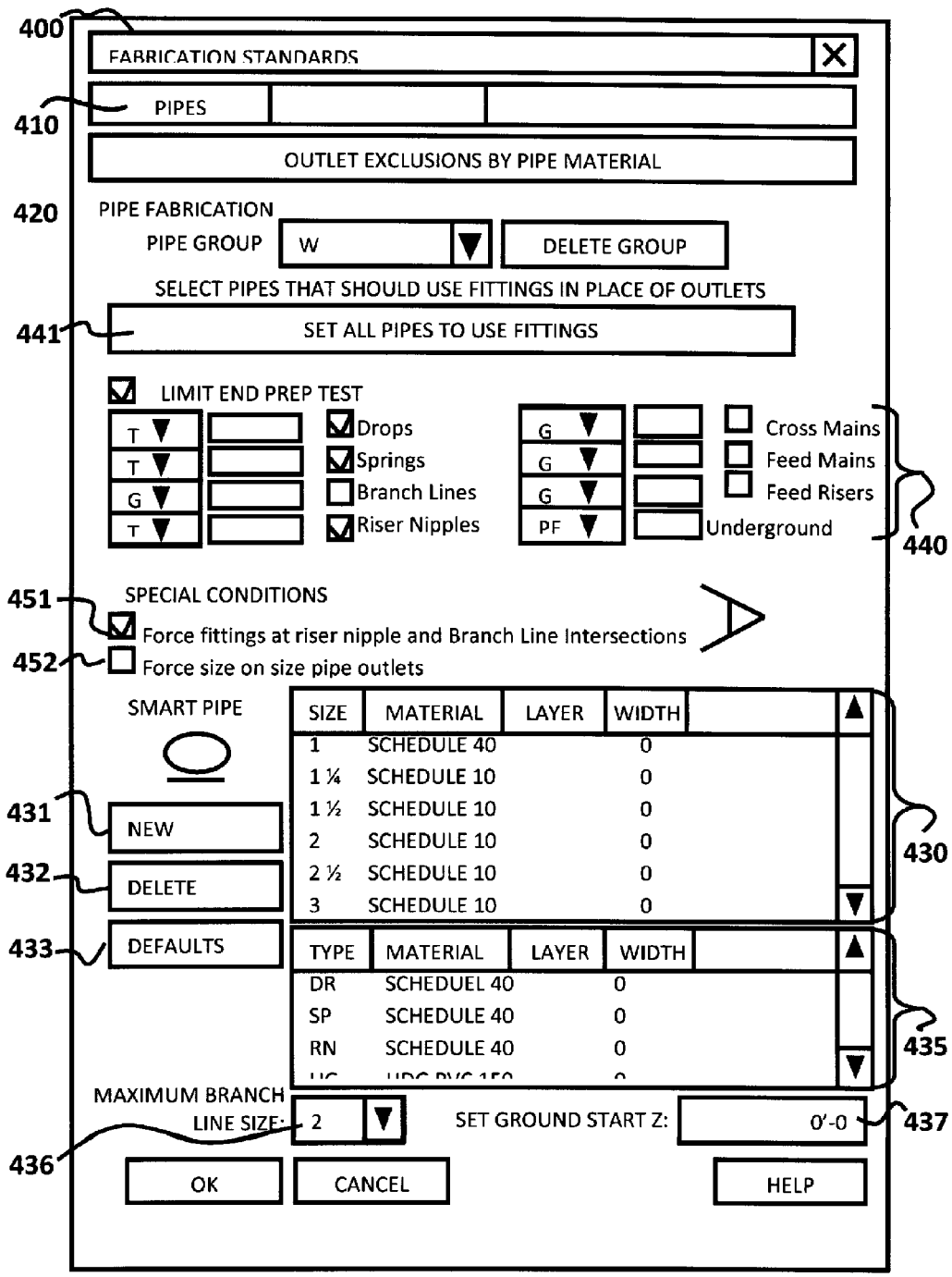
FIG. 5 is another illustration of a dialog box including a Smart Pipe interface.

For each group in drop-down list 420, a user may select Material, Layer, and Width parameters for each size pipe within a chosen Pipe Group. At Smart Pipe sized-based parameters listing 430, a user can set the Material type for each different size pipe within the chosen "T" Pipe Group (which, as described above, is selected at 420). For example, FIG. 4 at 430 shows that pipe size "1½" will be "Schedule 40" while pipe size "3" will be "Schedule 10". Compare to FIG. 5, which shows Pipe Group "W" selected at drop-down list 420. In FIG. 5 at 430, pipe size "1½" will be "Schedule 10" and pipe size "3" will also be "Schedule 10." The difference is that in FIG. 4 the user has selected Pipe Group T at 420, while in FIG. 5 the user has selected Pipe Group W at 420.

The purpose of Smart Pipe size-based parameters listing 430 is so that a user may set these parameters to his or her desired settings. A user may click into any entry within listing 430 to edit that listing. For example, a user may change any Material, Layer, or Width for any particular Size. It is also possible to include more columns within listing 430, so that other additional parameters may be set for each specific pipe size, as those skilled in the art would appreciate. A user may also add additional sizes to listing 430, as well as delete certain sizes. To add a size-based parameter a user may click button 431 ("New"), and a new row will appear in listing 430. To remove a listed size-based parameter, a user may select a size row to highlight it, and then may click button 432 ("Delete"), and the highlighted row will be deleted. Listing 430 will have default values which may be predetermined by a manufacturer or retailer. To restore such default values after changes have been made, a user can click on button 433 ("Defaults"). A user is also able to select various types of pipes to which parameters listing 430 will not apply, but will instead be overridden by a separate set of parameters. Override listing 435 allows a user to apply an alternative Material, Layer, Width, etc., parameter list to specific types of pipe. For example, FIG. 4 shows a user having chosen Drop type pipes (represented by the initials "DR" within override listings 435) to be set at material Schedule 40, no matter what size they are. In other words, the material of each drawn pipe will be determined by size-based parameter listing 430 unless the pipe is of a particular type listed in override listing 435, in which case that particular pipe material will be set by the override listing 435.

Fittings for each pipe may also be automatically selected by the disclosed system. AutoSPRINK users and CAD program users must decide whether pipes drawn into the overall CAD drawing are to use outlets or fittings. Fitting selection interface 440 allows a user to make these selections upfront and then apply such selections to all pipes drawn henceforth. All the various types of pipes are listed at 440, including Drops, Sprigs, Branch Lines, Riser Nipples, Cross Mains, Feed Mains, Feed Risers, and Underground. For each type of pipe that a user wishes to use a fitting instead of an outlet, the user would check or click the accompanying box. For example, FIG. 4 for a "T" pipe group shows Drops, Sprigs, Branch Lines, and Riser Nipples selected, but Cross Mains, Feed Mains, and Feed Risers not selected. FIG. 5, on the other hand, for a "W" pipe group shows similar user fitting selections at 440, except that Branch Lines are not selected.

A user also has the option to select all the types of pipes for fittings; the user can do this by clicking on button 441. Each selected pipe type will be automatically drawn prepared for a fitting instead of an outlet. A user may also select the type of fitting to be automatically drawn. In FIG. 4, there is a button with the letter "T" on it next to Drops, Sprigs, Branch Lines, and Riser Nipples, there is a button with the letter "G" on it to provide a grooved end preparation for Feed Mains, and Feed Risers, and there is a button with the letters "PE" on it to provide plain end pipe preparation for all Underground pipe. The letters represent a type of end of pipe preparation for which the program will provide the appropriate size and type fitting through various additional commands; for example, the letter "T" represents "threaded" end preparation, and the letter "G" represents "grooved" pipe end preparation. A user may manually attach the type of fitting from any of the fitting buttons and a drop-down fitting-type menu will appear, from which a user can select the type of fitting to be applied to each pipe (elbow, tee, cross etc.). A user may also initiate a cleanup feature of the program that will transform a pipe to the correct size and end preparation type based on the end preparation of the pipe it was placed on. This process may be completely automated by selecting all pipes that are to obtain fittings. Based on their geometry relative to one another, their size, and their pipe end preparation, the proper fittings are selected from the data base and placed on the pipes at all piping intersections automatically.

The color in which each type of pipe is displayed on-screen with the current drawing may also be selected by a user. Within fitting selections 440, a user may select the color that each type of pipe (Drops, Sprigs, Branch Lines, Riser Nipples, Cross Mains, Feed Mains, Feed Risers, or Underground) will be. The colored bars next to each pipe type at 440 represents the color that such pipe type will be on-screen. To change a color, a user may click on any of the color bars to bring up a drop-down menu, from which a user may select a desired color from a number of options.

Finally, the disclosed system for automatically selecting a pipe provides for a number of additional user options. At 436, a user is able to select the maximum branch line size from a drop-down listing of various size options. The value chosen at 436 may be used in combination with the predetermined rules described above to allow the system to automatically determine whether drawn pipes will be Branch Lines, Cross Mains, or Feed Risers based on size and/or orientation. At 437, a user is able to select the ground level relative to the z axis. For example, a user may select "20 feet" to indicate that ground level should be set at 20 feet below true zero of the drawing along the z axis. The value chosen at 437 may be used in combination with the predetermined rules described above to help the system automatically determine whether drawn horizontal pipes, for instance, will be Underground type pipes or cross mains. Finally, a user may choose to force fittings at an intersection of a Riser Nipple and a Branch Line by checking or clicking box 451. A user may also separately choose to force size on size pipe outlets by checking or clicking box 452.

Once all the options and parameters within Pipes tab 410 of Fabrication Standards dialog box 400 have been chosen by a user, the system is ready to automatically select pipes. When a user draws a pipe with one of the various pipe-drawing tools or functions in AutoSPRINK or in another CAD drawing program, the pipe's parameters (Material, End preparation, Outlet, Color, Layer, Width, Type, etc.) are automatically drawn based on the parameters mentioned above (i.e. size, orientation, location, association with other pipes etc). The system utilizes the location of the user-drawn pipe (both absolute location and relative location, i.e., what type(s) of pipe are adjacent, for example) in combination with the various non-user-adjustable rules described above and the user-adjustable parameters and options within Pipes tab 410 to determine the pipe's parameters and then draw the pipe. It should be noted that a system for automatically selecting or determining a pipe may be equipped with manufacturer or vendor provided default settings for Pipes tab 410 parameters and options so that the system is ready to automatically select a pipe based solely on vendor or manufacturer specified parameters (such as BIM—Building Information Models—or other applicable standards). Such standards may be used by the system if a user has not previously made his or her selections within Pipes tab 410. It should also be noted that many additional rules, parameters, and options will be apparent to those skilled in the art, and that any of these additional rules, parameters, and/or options may be incorporated into the system for automatically selecting, determining or specifying a pipe.

Figure 6:
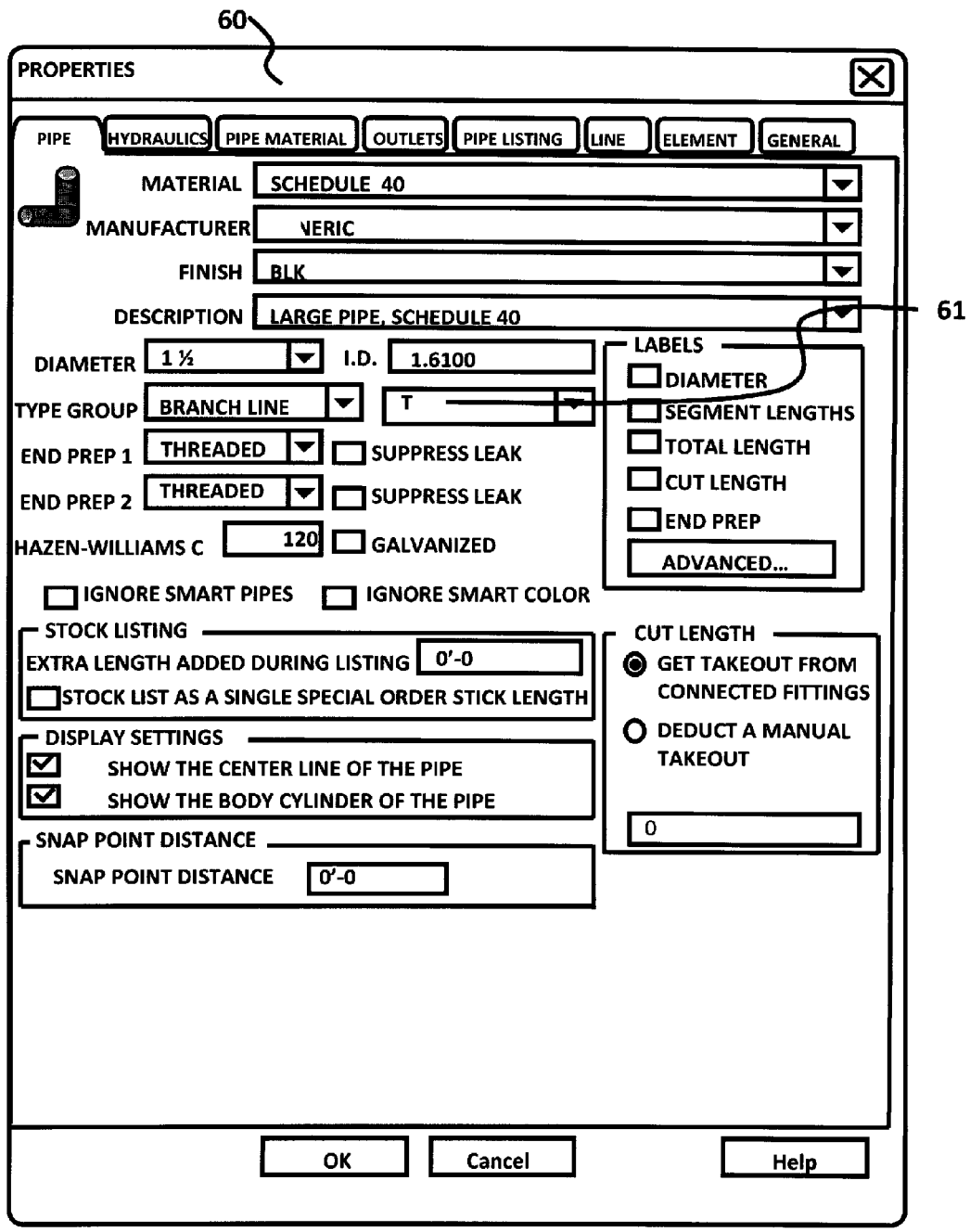
FIG. 6 is an illustration of a Pipe Properties dialog box.
Figure 7:
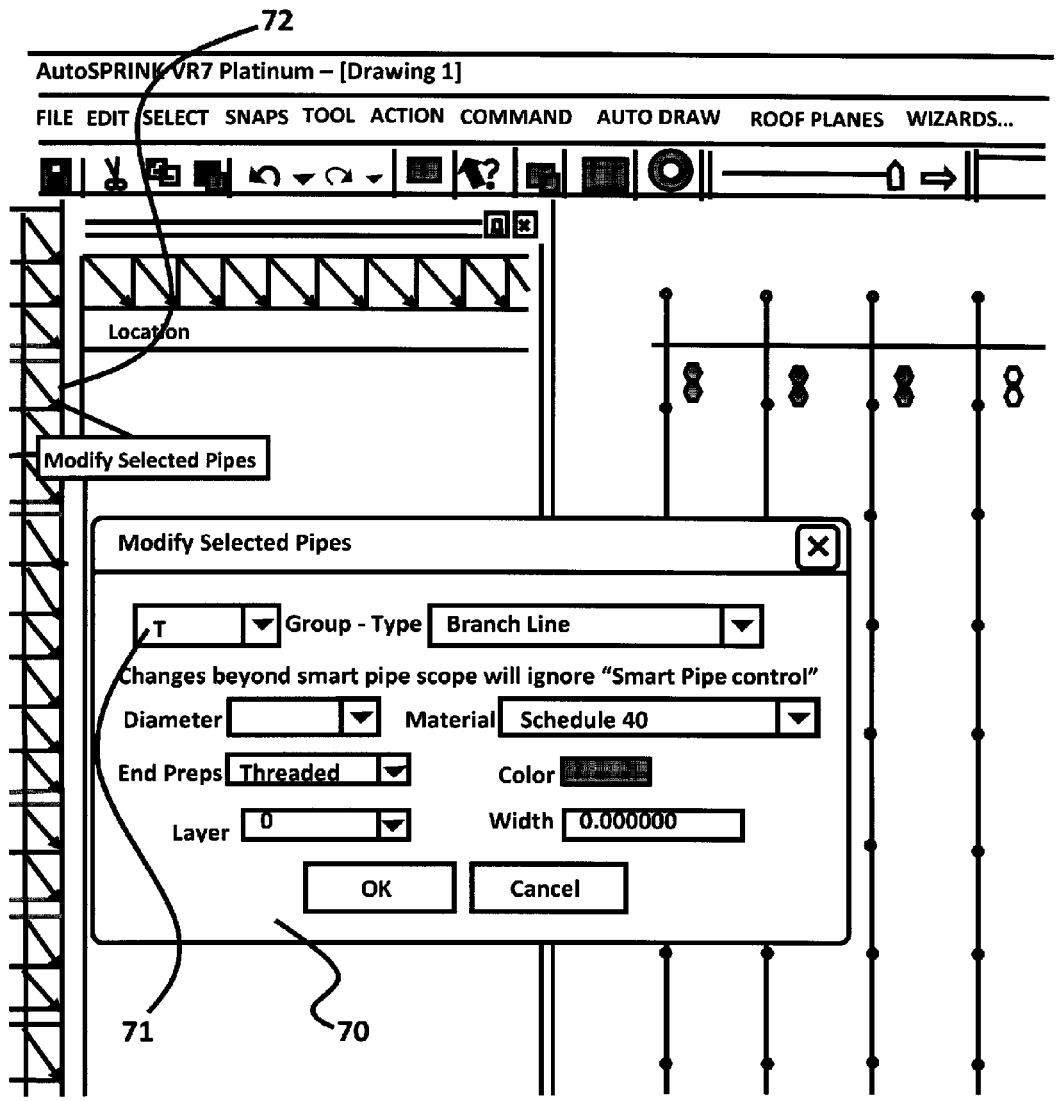
FIG. 7 is an illustration of a Modify Selected Pipes dialog box.

An additional powerful aspect of this feature is the system's ability to automatically alter, revise, or change any of the selected piping already drawn in the main CAD design drawing by simply changing the pipe group letter or number designation. This can also be done by selecting the pipes and editing a pipe property dialog box by changing the pipe group letter or number designation. FIG. 6 illustrates pipe property dialog box 60, which may be accessed from the overall CAD program by selecting from a drop-down menu or by clicking on a pipe properties icon within a tool bar. A user may change any selected pipe by clicking on pipe group drop-down menu 61 and choosing a different pipe group letter or number designation. Alternatively, a user may select one or more pipes to be revised and use a modify pipe button from the piping tool bar. FIG. 7 illustrates Modify Selected Pipes dialog box 70. A user may access Modify Selected Pipes dialog box 70 by clicking on a Modify Selected Pipes icon 72 within a tool bar. A user may use Modify Selected Pipes dialog box 70 to change the group letter or number designation by clicking on drop-down menu 71 and selecting a different pipe group letter or number designation and then the OK button. All selected pipes will be automatically changed to the parameters of the new pipe group. For example, changing a "T" pipe group (with threaded schedule 40 end preparation and able to accept fittings in lieu of outlets) to a "W" pipe, will then automatically convert the pipe to schedule 10 pipe with grooved end preparation with welded outlets in lieu of fittings because of user-chosen parameters previously selected for "W" pipes within the system for automatically determining a pipe.

A final CAD drawing add-on feature—system, method, and apparatus for placing a flexible drop in a CAD drawing—will now be described. This may alternatively be referred to as a Flex Drop Interface. As with the above described CAD drawing conflict resolution system and system for automatically determining a system pipe type, the system for placing a flexible drop in a CAD drawing will generally be referred herein as a system. This specification does, however, intend to include within its scope the related methods of placing a flexible drop, the related apparatus for placing a flexible drop, and the related computer program feature for placing a flexible drop. The system allows a user to relatively easily draw a flexible drop from a pipe to a sprinkler head in a CAD drawing. The system also allows flexible drops to be automatically placed, and allows automatic hard piping from a remote sprinkler system pipe to within a specified distance from a pendent sprinkler head, and then for automatic placement of a flexible drop.

Figure 8:
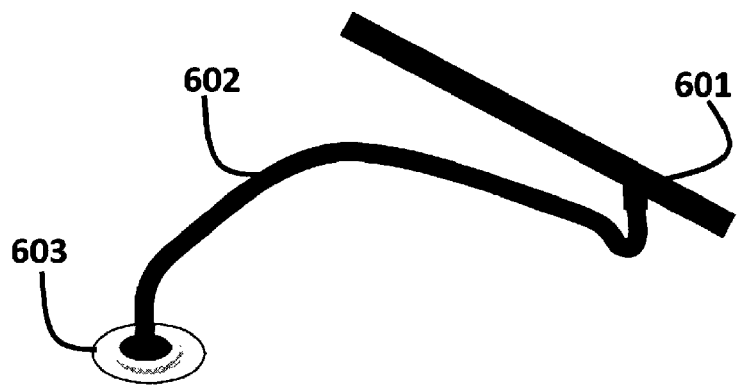
FIG. 8 is an illustration of a flexible drop used to connect a sprinkler head to a sprinkler system pipe in accordance with the present invention.
Figure 9:
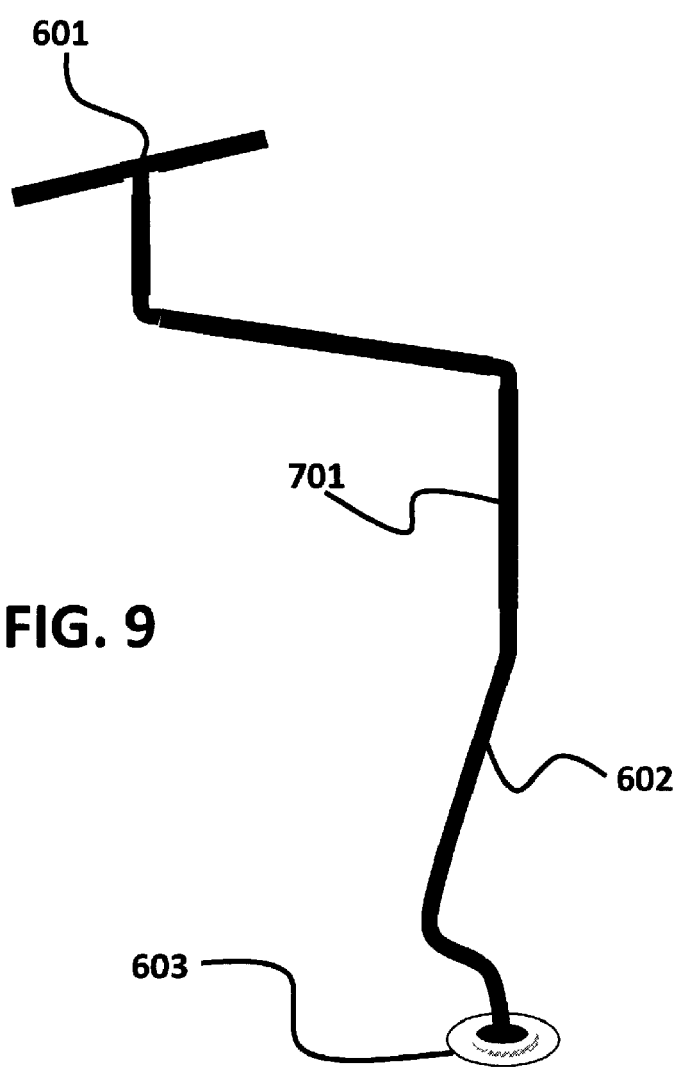
FIG. 9 is another example of a flexible drop, additionally illustrating the use of a hard pipe arrangement in accordance with the present invention.

FIGS. 8 and 9 illustrate what a flexible drop is and how it may be used to connect a sprinkler head to a sprinkler system pipe. Sprinkler system pipe 601 runs through a room of a building and connects to a water source outside the scope of the figures. Sprinkler head 603 is located some distance away from sprinkler system pipe 601. Sprinkler heads may be placed at odd or irregular positions relative to the sprinkler system pipe, and so traditional rigid connecting pipes may not be appropriate for connecting sprinkler head 603 to sprinkler system pipe 601. In such circumstances it is common to use so-called "flexible drops" to connect sprinkler heads to sprinkler system piping. These flexible drops (which may be referred to as Flex Drops) are usually formed of metal ring-like components joined together to create a flexible metallic pipe. Such flexible piping may be used in other contexts to flexibly connect any two components. For example, such flexible connects may be used to house electrical wiring which may be required to run in a flexible, or curved, pathway between two points. Flex Drops may be manufactured in any desirable length, but common lengths are 24 inches, 36 inches, 48 inches, 60 inches, and 72 inches. If a situation calls for connecting a sprinkler head to a sprinkler system pipe located further away, a hard pipe arrangement of piping may be used to go from the sprinkler system pipe to within a close distance to the sprinkler head, and then a Flex Drop is used to finish the connection. Such a sprinkler system pipe hard pipe→flex drop→sprinkler head design can be seen in FIG. 9. Sprinkler system pipe 601 connects to hard pipe 701 which connects to Flex Drop 602 which finally connects to pendent sprinkler head 603.

The herein described system for placing a flexible drop pipe allows a user to automatically draw connections in a CAD drawing for a number of sprinkler heads to one or more sprinkler system pipes simultaneously (or automatically). This is desirable because CAD drawings of sprinkler systems, and building designs in general, can contain many sprinkler heads which each may be oddly or irregularly located. Having to draw connections manually (meaning separately drawing in each pipe drop or flex drop) can be difficult and time consuming for a user. The present invention provides a utility for AutoSPRINK (or for another CAD drawing program) to automatically connect several sprinkler heads to sprinkler system pipes at once, utilizing a number of user-adjustable parameters. The system allows a user to determine which sprinkler system pipes to connect by selecting the pipes and sprinkler heads to be connected at the closest intervals, cutting down on decisions, calculations, and guesswork required by the user. The system may also allow a user to select a set of sprinkler heads, and have the system automatically determine which sprinkler system pipes to connect each sprinkler head to, and then draw such connections. The system may additionally be capable of automatically drawing flexible drops when a user has specifically selected both sprinkler head locations and connection point locations on one or more sprinkler system pipes.

The present invention is most useful by a AutoSPRINK or CAD program user at a point in time after the user has drawn the main piping throughout his or her building design and has picked and placed sprinkler heads at desired locations. Of course, a user may choose to use the present invention to connect a single sprinkler head, and then return to use the present invention again at a later time. But a user who has previously drawn at least one sprinkler head and at least a pipe may facilitate a flex drop connection by either selecting a Connect Pipes to Sprinklers function, a Connect Sprinklers to Pipes function, or a drop connect wizard within AutoSPRINK or another CAD program. In either case, the user will be presented with a dialog box which will allow the user to select various methods of connecting the sprinkler head(s) to the sprinkler pipe(s). Two of these options (there may be many more than two options) will be to use either a flex drop on its own, or a hard pipe to flex drop.

Figure 10:
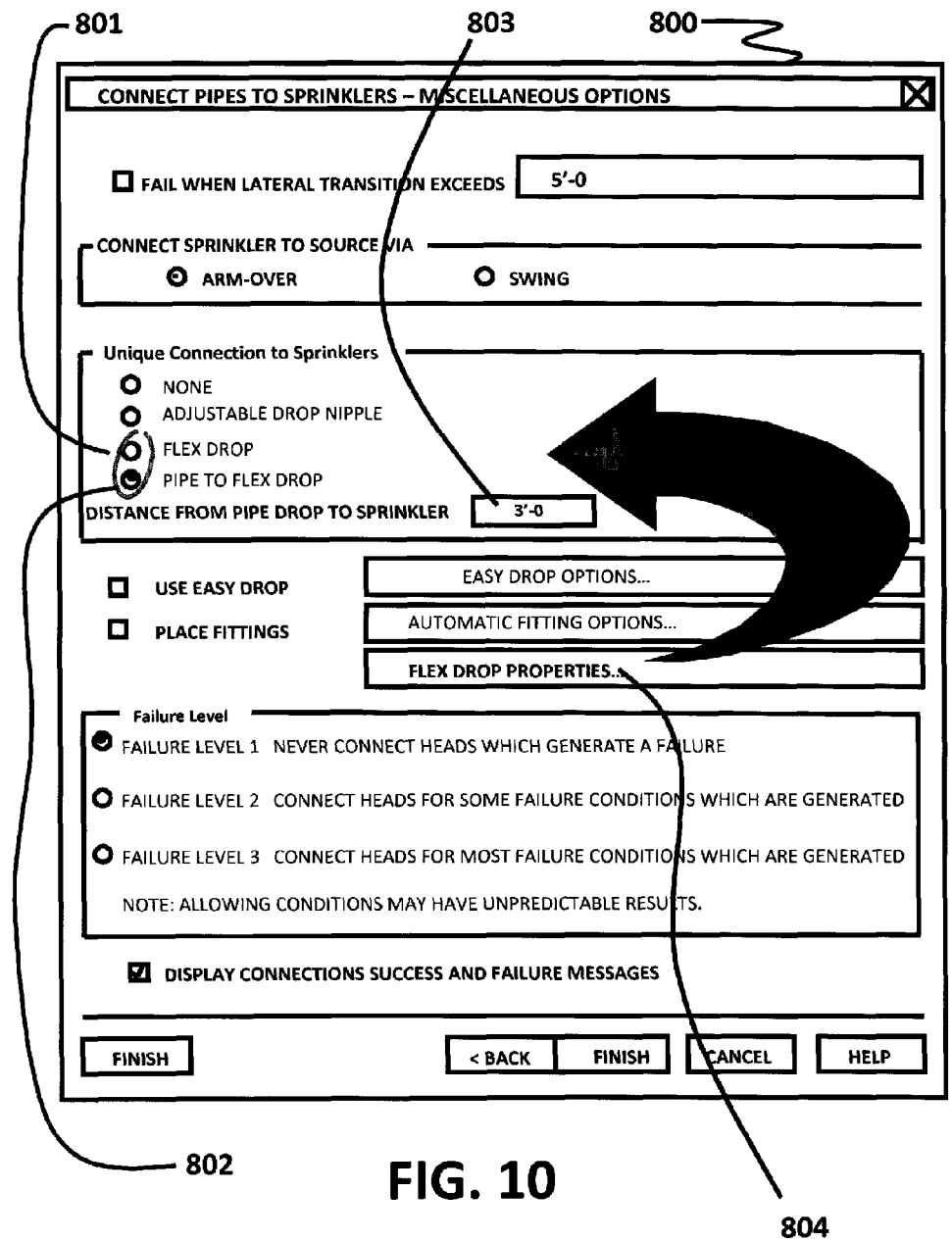
FIG. 10 is an illustration of a Connect Pipes to Sprinkler dialog box in accordance with the present invention.

FIG. 10 illustrates an example of a Connect Pipes to Sprinklers dialog box 800, which may be accessed by a user by clicking on an icon within a CAD program tool bar, by a user by selecting Connect Pipes to Sprinklers within a drop-down menu, or by a user initiating a drop connect wizard. Within Connect Pipes to Sprinklers dialog box 800, a user may select either Flex Drop radio button 801 or Pipe to Flex Drop radio button 802, if the user desires to use flexible drops to connect sprinkler heads to sprinkler system pipes. There may be many additional options within Connect Pipes to Sprinklers dialog box 800, but these additional options may be unrelated to Flex Drops. Ways of selecting either flexible drop option (Flex Drop 801 or Pipe to Flex Drop 802) may vary. It may be that a user is faced with more traditional click-buttons or drop-down menus when deciding whether to choose flexible drops. If a user chooses to utilize Pipe to Flex Drop 802 option, the user may then additionally be able to choose the length of the flexible drop that follows the hard piping (Flex drop 602 portion in FIG. 9).

Distance from pipe drop to sprinkler input 803 in FIG. 10 shows a user determined distance of "3'-0", meaning three feet and zero inches. A user may be restricted at input 803 and may only be able to choose from a predetermined list of allowable distances; two feet, three feet, or four feet, for example. Or it may be that a user can select any distance at input 803, such as four feet and seven-and-a-half inches, for example. A user is then able to fine-tune Flex Drop properties by clicking on properties button 804, which may open up a new Flex Drop properties dialog box (an example being Flex Drop properties dialog box 1000 shown in FIG. 12).

Figure 11:
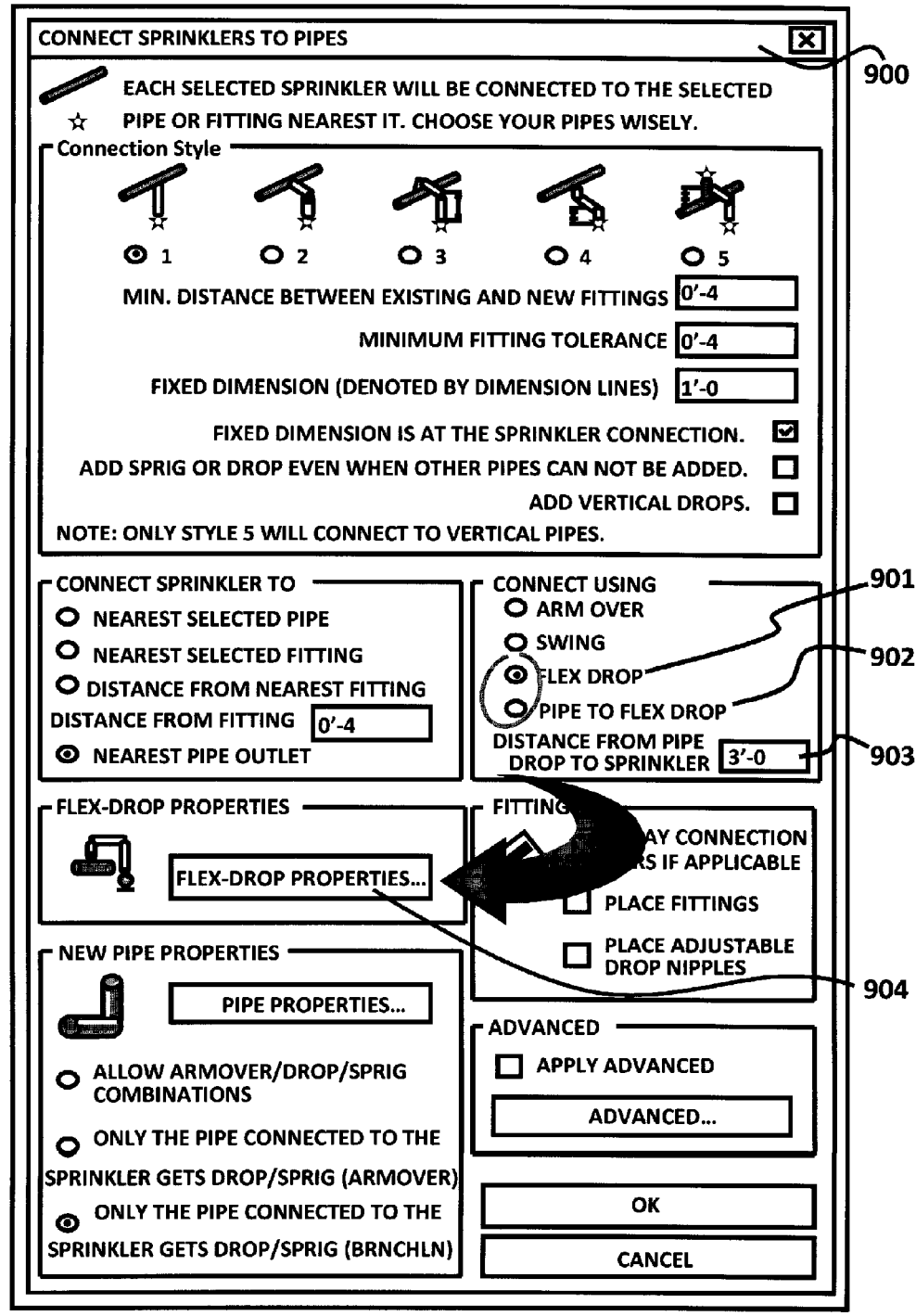
FIG. 11 is an illustration of a Connect Sprinklers to Pipes dialog box in accordance with the present invention.

FIG. 11 illustrates an example of a Connect Sprinklers to Pipes dialog box. Connect Sprinklers to Pipes dialog box 900 may be accessed by a user by clicking on an icon within a CAD program tool bar, or may be accessed by a user by selecting Connect Sprinklers to Pipes within a drop-down menu. User operation of Connect Sprinklers to Pipes dialog box 900 is very similar to user operation of Connect Pipes to Sprinklers dialog box 800 in FIG. 10. Within Connect Sprinklers to Pipes dialog box 900, a user may select either Flex Drop radio button 901 or Pipe to Flex Drop radio button 902 if the user desires to use flexible drops to connect sprinkler heads to sprinkler system pipes. There may be many additional options within Connect Sprinklers to Pipes dialog box 900, but these additional options may be unrelated to Flex Drops. Ways of selecting either flexible drop option (Flex Drop 901 or Pipe to Flex Drop 902) may vary. It may be that a user is faced with more traditional click-buttons or drop-down menus when deciding whether to choose flexible drops.

If a user chooses to utilize Pipe to Flex Drop 902 option, the user may then additionally be able to choose the length of the flexible drop that follows the hard piping (Flex drop 602 portion in FIG. 7). Distance from pipe drop to sprinkler input 903 in FIG. 11 is grayed-out because in the FIG. 11 example the user has selected Flex Drop radio button 901 and so input 903 is inaccessible. But if a user instead selects Pipe to Flex Drop 902, input 903 will then be accessible and the user will be able to input the desired distance at 903. A user may be restricted at input 903 and may only be able to choose from a predetermined list of allowable distances; two feet, three feet, or four feet, for example. Or it may be that a user can select any distance at input 903, such as four feet and seven-and-a-half inches, for example. A user is then able to fine-tune Flex Drop properties by clicking on properties button 904, which may open up a new Flex Drop properties dialog box (an example being Flex Drop properties dialog box 1000 shown in FIG. 12).

Figure 12:
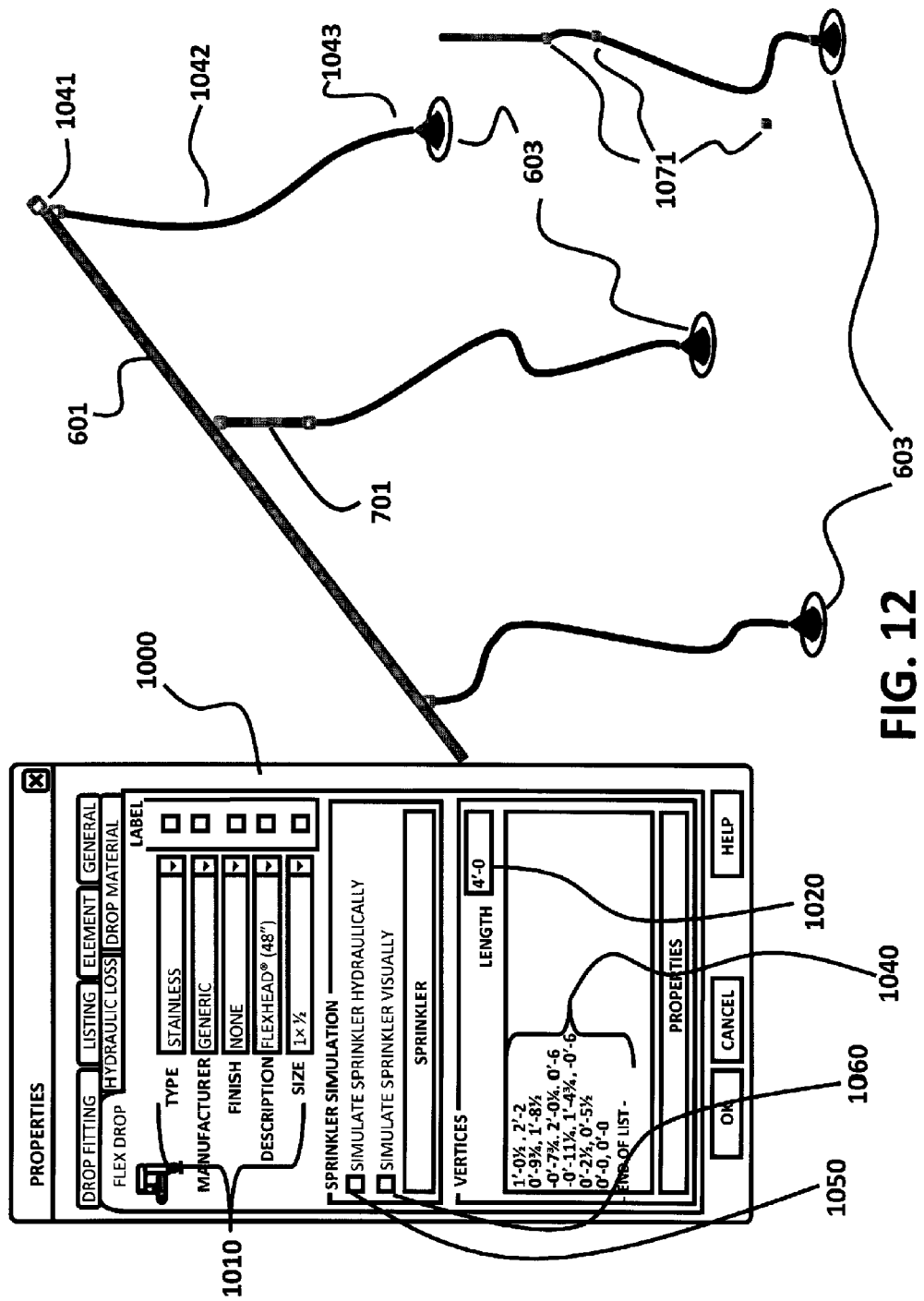
FIG. 12 is an illustration of a Flex Drop properties dialog box within a CAD drawing program in accordance with the present invention, and also shows a user-adjustable flexible drop previously automatically placed.

FIG. 12 illustrates an example of a Flex Drop properties dialog box and also illustrates an example of a flexible drop as it may appear within an overall CAD drawing as seen by a user on his or her computer screen. Flex Drop properties dialog box 1000 may be accessible in a number of ways. As discussed above, a user may be able to click on a button within either a Connect Pipes to Sprinklers dialog box or a Connect Sprinklers to Pipes dialog box. Or, a user may be able to directly access Flex Drop properties dialog box 1000 by either clicking on an icon within a CAD program tool bar or by selecting a Flex Drop properties option within a CAD program drop-down menu. Flex Drop properties dialog box 1000 may have several user options within it, but the main purpose of dialog box 1000 is to present information to the user. After the system has placed flexible drops to connect sprinkler heads to the nearest or best sprinkler system pipes, a user is able to access Flex Drop properties dialog box 1000 to view information and parameters of the automatically placed flexible drops.

There may be several available user options within Flex Drop properties dialog box 1000. At 1010, a user may be able to choose a type of flexible drop (Stainless, Aluminum, etc.), male or female type connectors, a manufacturer (a specific company or generic), a finish (polished, none, etc.), a description (FlexHead® 48", FlexHead 36", FlexHead 24", etc.) and a size (1×½, 2×1, etc.). At length 1020, a user is able to see precisely how long a flex drop drawn by the system for placing a flexible drop is. The example in FIG. 12 shows a length at 1020 of "4'-0" or four feet and zero inches. This is the true length of the curved flex drop. A user may additionally be able to input a hydraulic equivalent length he or she wishes the system to allow for.

When a user manually draws a flex drop from a sprinkler head to a sprinkler system pipe, or visa versa, the flex drop piping will stop at the manufacturer specified length. This manufacturer specified length is shown at 1010 in FIG. 12, in the Description box. The example in FIG. 12 at 1010 shows a manufacturer specified length of 48 inches ("FlexHead®) (48")"). For example, if a user connects a sprinkler head to a sprinkler system pipe that is 60 inches away, the user will see a visible gap of 12 inches (the difference between the 60 inch distance and the 48 inch flex drop). This gap will warn the user that the specified flex drop is not long enough, which may be remedied by either using a longer flex drop or by moving the pipe closer to the sprinkler head.

At vertices 1040 in FIG. 12, a user is able to see locations of the three vertices of the flex drop. A flex drop has three vertices which may each be located by x, y, and z coordinates. In FIG. 12, three vertices for a flex drop can be seen at 1041, 1042, and 1043. 1041 is the end of the flex drop which connects to pipe 601. 1042 is the mid point of the curved portion of the flex drop. 1043 is the end of the flex drop which connects to sprinkler head 603. Vertices 1040 list the x, y, and z coordinates for a flex drop. A user is also able to choose whether to simulate the drawn and presumably connected sprinklers. At 1050 a user can click a box to simulate one or more sprinklers hydraulically. At 1060 a user can click a box to simulate one or more sprinklers visually.

After the system has automatically placed, or drawn, one or more flex drops, a user is able to pull or push a flex drop to change its curve, orientation or appearance. FIG. 12 illustrates this ability. Grips 1071 are provided surrounding a previously placed flex drop. A user may be able to click on one of grips 1071, and then drag that grip to a new location. Dragging a grip 1071 will automatically change the appearance of the related flex drop, so that it curves in a slightly different way, for example. FIG. 12 shows four grips 1071, but more grips or less grips may be provided. More grips 1071 would enable a user to more precisely control the appearance of a flexible drop.

Finally, it should be noted that flex drops automatically (or manually with a user's guidance) placed by the system for placing flexible drops are additionally capable of being hydraulically calculated as part of an overall piping or sprinkler system. Such flex drops are also capable of being simulated with water flow. In other words, these flex drops placed by the herein disclosed system become integrated into the overall CAD drawing and may be simulated similarly to any other pipe or piping within the CAD drawing.

While the present invention has been illustrated and described herein in terms of a preferred embodiment and several alternatives associated with add-on features for automatically improving, adding additional features to, and processing various piping-related features of a computer automated design application, it is to be understood that the various components of the combination and the combination itself can have a multitude of additional uses and applications. For example, the system for resolving CAD drawing conflicts herein disclosed can easily be adapted to other settings or uses such CAD drawing of smaller mechanical parts or other construction systems such as electrical systems or lavatory plumbing systems. As another example, the system for determining a pipe type can be applied to other CAD-related design, such as designing electrical schematics wherein the disclosed system could be used to determine types of wiring to be used throughout the schematic. As another example, the system for placing flexible drops can be utilized to draw non-sprinkler system connections, such as flexible housing for electrical wiring. Accordingly, the invention should not be limited to just the particular descriptions and various drawing figures contained in this specification that merely illustrate one or more preferred embodiments and applications of the principles of the invention.

It should be apparent that the examples discussed above are only presented as examples. The various user-accessible menus, buttons, and interfaces are only one way to accomplish the more generally described systems, methods, apparatuses, and computer programs. For example, where certain features or user options are described as buttons, it may be apparent to those skilled in the art that the same function can be accomplished by using radio buttons, drop-down menus, or check-box-type options instead. All such available possibilities are intended to be covered by this specification.

Finally, it should be noted that where this specification describes a system for accomplishing a CAD-related task, it is intended to cover related methods of accomplishing the CAD-related task, related apparatuses for accomplishing the CAD-related task, and related computer programs for accomplishing the CAD-related task. For example, an apparatus for accomplishing the CAD-related task would be comprised of a central processing unit (CPU) containing the code for the carrying out the CAD-related tasks and capable of processing user-input options, one or more input devices such as a keyboard and mouse, and a computer screen.

What is claimed is:

1. A method for determining and drawing a flexible drop for connecting a sprinkler head to a sprinkler system pipe within a CAD drawing of a sprinkler system, comprising the steps of:
receiving from a user a location for the sprinkler head;
receiving from the user one or more parameters for determining the flexible drop, the one or more parameters including a connection type between the sprinkler head and the sprinkler system pipe, the connection type including a flexible drop configuration and a hard-pipe-to-flexible-drop configuration;
determining a connection point on the sprinkler system pipe for connecting the flexible drop based on the location for the sprinkler head, a location for the sprinkler system pipe, and the one or more parameters;
if the connection type is the flexible drop configuration, drawing the flexible drop within the CAD drawing from the connection point to the location for the sprinkler head; and
if the connection type is the hard-pipe-to-flexible-drop configuration, drawing a hard pipe within the CAD drawing from the connection point to a pipe-drop-to-sprinkler distance, and drawing the flexible drop within the CAD drawing from the pipe-drop-to-sprinkler distance to the location for the sprinkler head.

2. The method as in claim 1, wherein the one or more parameters further include a length of the flexible drop.

3. The method as in claim 2, wherein the length is selected by the user from a predetermined list of allowable lengths.

4. The method as in claim 2, wherein the length is a desired length input by the user.

5. The method as in claim 1, wherein the one or more parameters further include the pipe-drop-to-sprinkler distance.

6. The method as in claim 5, wherein the pipe-drop-to-sprinkler distance is selected by the user from a predetermined list of allowable lengths.

7. The method as in claim 5, wherein the pipe-drop-to-sprinkler distance is a desired length input by the user.

8. The method as in claim 1, wherein the one or more parameters include a list of types of the flexible drop from which the user may choose.

9. The method as in claim 8, wherein the list of types includes stainless steel and aluminum.

10. The method as in claim 1, wherein the one or more parameters include a list of connectors from which the user may choose.

11. The method as in claim 10, wherein the list of connectors includes a male connector and a female connector.

12. The method as in claim 1, wherein the one or more parameters include a list of manufacturers from which the user may choose.

13. The method as in claim 1, wherein the one or more parameters include a list of finishes for the flexible drop from which the user may choose.

14. The method as in claim 13, wherein the list of finishes includes polished and none.

15. The method as in claim 1, wherein the one or more parameters include a list of sizes from which the user may choose.

16. The method as in claim 1, wherein the one or more parameters include a desired hydraulic equivalent length.

17. The method as in claim 1, further comprising the step of determining if the flexible drop is drawn between the location and the connection point with a gap between the flexible drop and the connection point.

18. The method as in claim 17, wherein if the gap exists, further comprising the step of communicating an existence of the gap to the user.

19. The method as in claim 1, further comprising the step of determining if the flexible drop is drawn between the location and the connection point with a gap between the flexible drop and the location.

20. The method as in claim 19, wherein if the gap exists, further comprising the step of communicating an existence of the gap to the user.

21. The method as in claim 1, further comprising the step of communicating to the user a set of coordinates indicating a location of the flexible drop within the CAD drawing.

22. The method as in claim 21, wherein the set of coordinates includes an X, a Y, and a Z coordinate for each of a plurality of vertexes.

23. The method as in claim 1, further comprising the step of hydraulically simulating the flexible drop within the CAD drawing.

24. The method as in claim 1, further comprising the step of altering a curve of the flexible drop drawn within the CAD drawing in response to a manipulation by the user of the flexible drop within the CAD drawing.

25. The method as in claim 1, further comprising the step of altering an orientation of the flexible drop drawn within the CAD drawing in response to a manipulation by the user of the flexible drop within the CAD drawing.

26. The method as in claim 1, further comprising the step of altering an appearance of the flexible drop drawn within the CAD drawing in response to a manipulation by the user of the flexible drop within the CAD drawing.

27. The method as in claim 1, further comprising the step of integrating the flexible drop into the CAD drawing so as to enable a hydraulic calculation of the sprinkler system.

28. The method as in claim 1, further comprising the step of integrating the flexible drop into the CAD drawing so as to enable a hydraulic simulation of the sprinkler system.

* * * * *